UNITED STATES PATENT OFFICE.

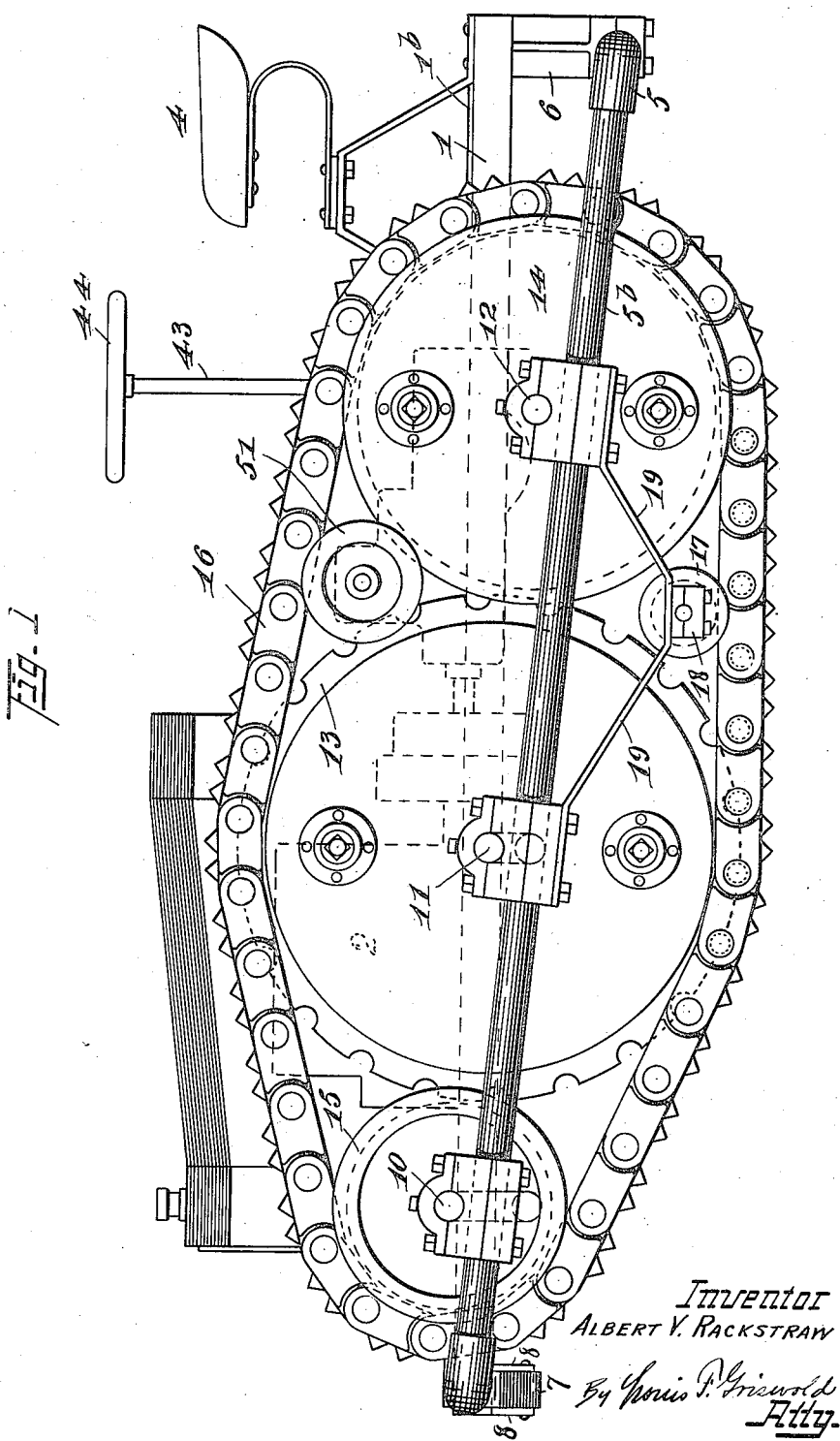

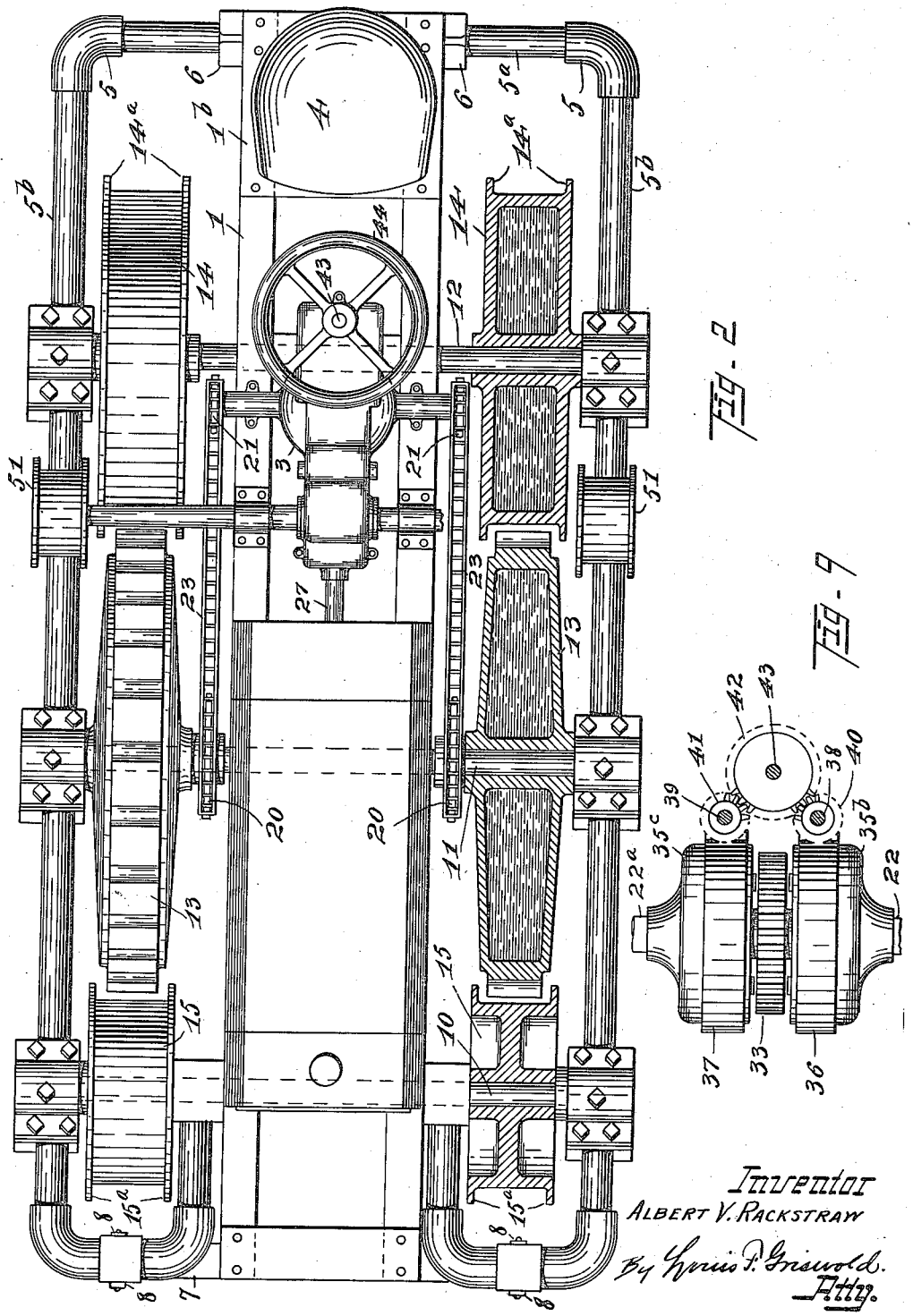

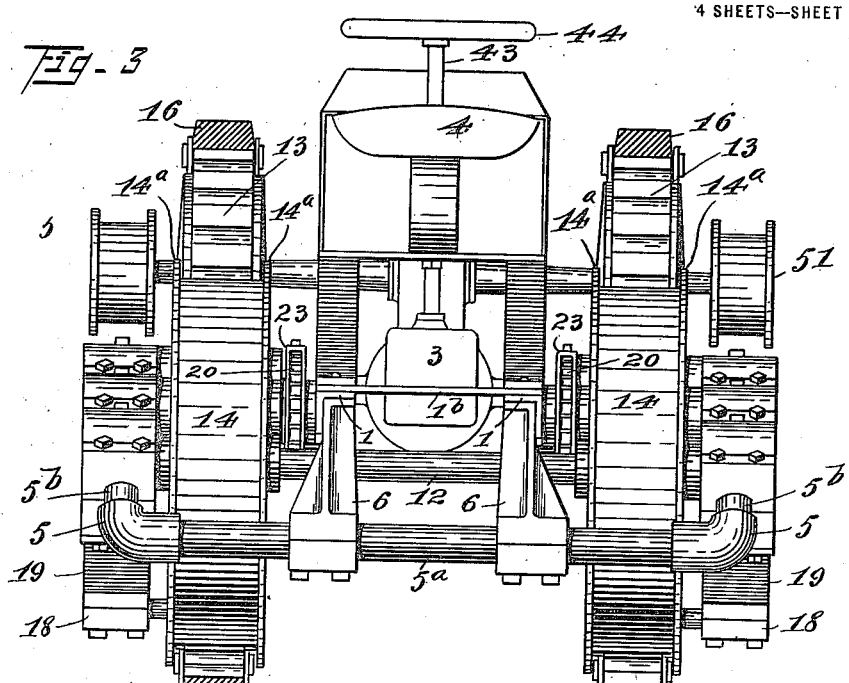
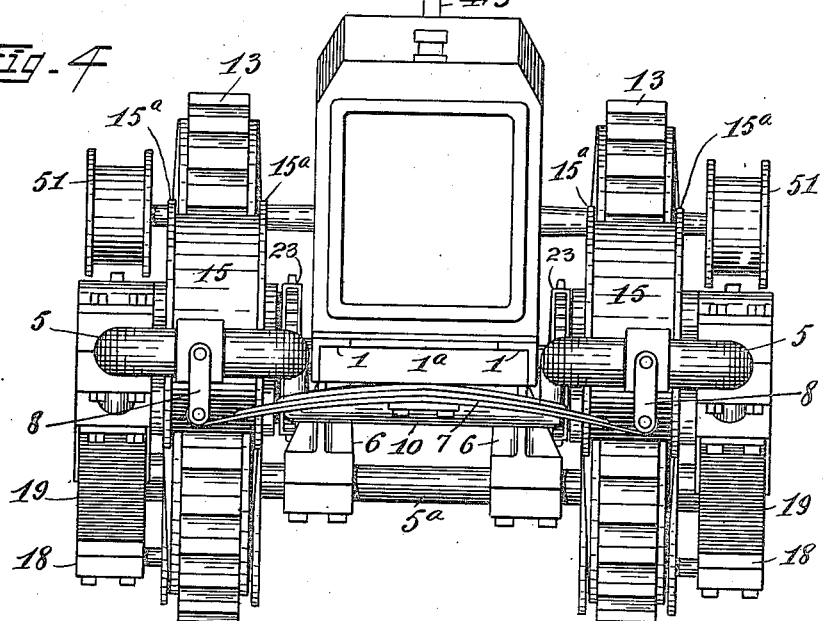

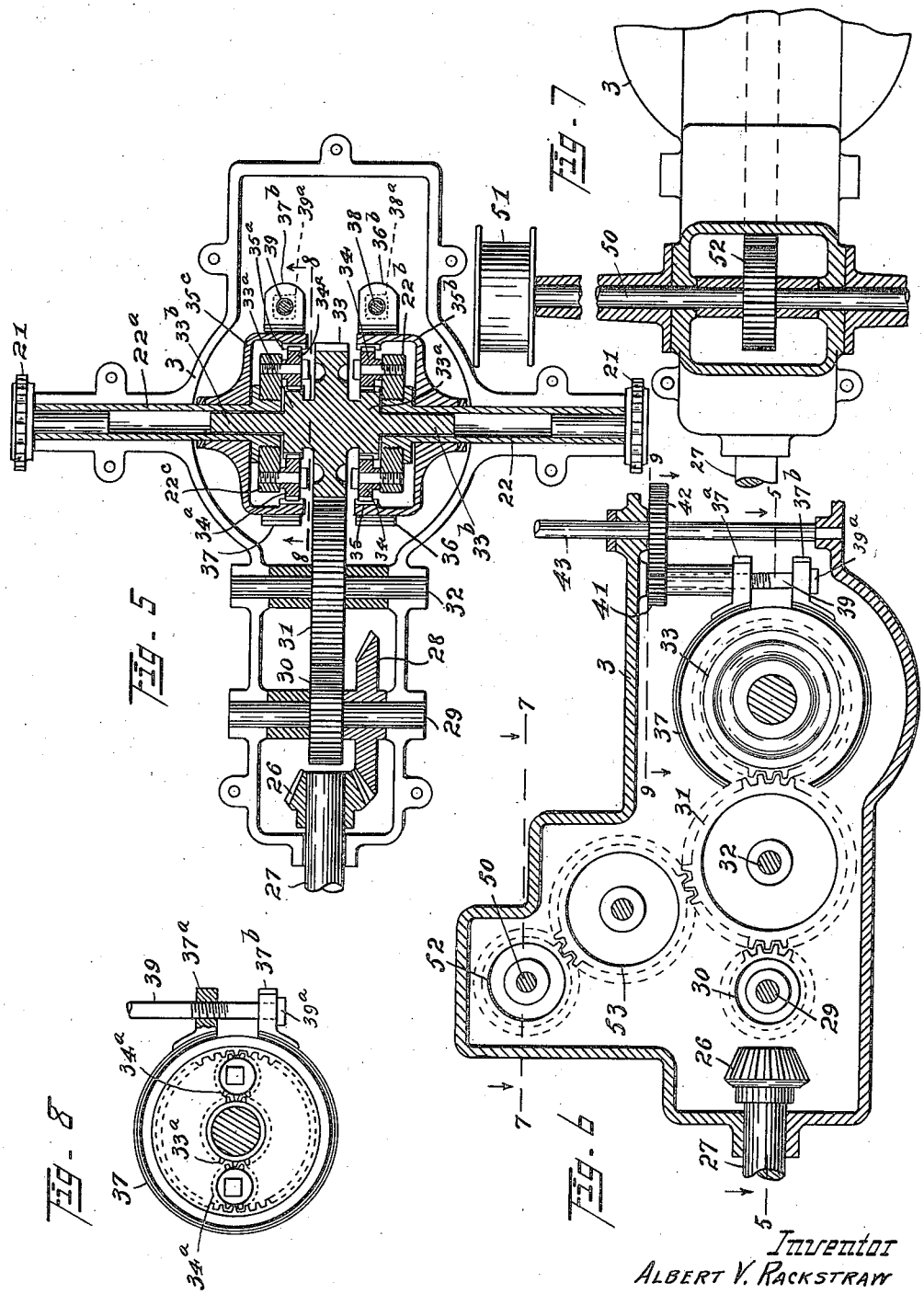

ALBERT V. RACKSTRAW, OF BEDFORD, OHIO.

TRACTOR.

1,311,577.

Specification of Letters Patent.  Patented July 29, 1919.

Application filed March 30, 1918. Serial No. 225,694.

*To all whom it may concern:*

Be it known that I, ALBERT V. RACKSTRAW, a subject of the King of Great Britain, residing at Bedford, in the county of Cuyahoga and State of Ohio, have invented certain new and useful Improvements in Tractors, of which the following is a specification.

This invention relates to what are commonly known as crawler or chain tread tractors, that are used for farm work in general; and has for its primary object the provision of a machine of the character specified, that is light, cheap, durable and easily managed. A further object is the provision of a machine that is efficient for all functions required, and for operation on differing conditions of soil.

With these objects in view the invention consists in the construction, combination and arrangement of parts shown in the drawings, and hereinafter described and pointed out definitely in the appended claims.

In the drawings Figure 1 is a side elevation of the improved tractor.

Fig. 2 is a plan view with the chain treads removed and the traction wheels on one side, in section.

Fig. 3 is a rear end view showing the chain treads in section.

Fig. 4 is a front elevation with the chain treads eliminated.

Fig. 5 is a transverse horizontal section through the transmission gear case and mechanism on line 5—5, Fig. 6, with two of the gears not sectioned.

Fig. 6 is a central vertical section through the said case and mechanism.

Fig. 7 is a section substantially on line 7—7, Fig. 6.

Fig. 8 is a section on line 8—8, Fig. 5, and Fig. 9 is a plan of a portion of the transmission mechanism on line 9—9, Fig. 6.

A rectangular main frame comprising side members 1, an end member 1ª and a connecting end plate 1ᵇ, supports the motor 2, transmission case 3 and the operator's seat 4. A traction frame 5, preferably made of steel tubing, supports the main frame, the rear member 5ª having bolsters 6 mounted thereon, to which the rear ends of the side members 1 are attached. The forward end of the main frame has a spring connection with the traction frame, a leaf spring 7 being attached to the cross member 1ª of the main frame, while the ends of said leaf spring are connected by shackles 8 with the front of the traction frame, as best shown in Fig. 4.

Axles 10, 11 and 12 are rigidly attached to the side members 5ᵇ of the traction frame, said axles extending transversely between and at right angles to the members 5ᵇ. Driving traction wheels 13 are mounted to rotate on the axle 11 between the main frame and the traction frame, said wheels being arranged on each side of the main frame, as best shown in Fig. 2. Flanged traction wheels 14 are idly mounted on the shaft 12 on each side of the main frame, and flanged traction wheels 15 of smaller diameter are idly mounted on the shaft 10 near the front of the machine. The wheels 14 and 15 are in line with the driving traction wheels 13 on each side of the main frame, and endless link chain traction belts 16 of any suitable construction, embrace the end traction wheels 14 and 15 and the intermediate driving traction wheels 13, on each side of the machine,—the links of the chains being of such width that they may go between the two flanges 14ª of the rear wheels, and the flanges 15ª of the forward wheels and thereby guide the chains. Each traction wheel 13 is in the form of a sprocket wheel which is adapted to engage and drive the associated traction belt. Flanged wheels 17 are disposed between and in line with the wheels 13 and 14. The wheels 17 are rotatably mounted in boxes 18 which are supported by brackets 19 attached to the traction frame. These wheels engage the lower leg of the traction belt, and thereby help it to support the weight of the machine, and likewise they increase the traction of the belt upon the ground.

The hub of each driving traction wheel 13 is provided with a sprocket 20; and these sprockets are in line with sprockets 21, which are rigidly attached to tubular transmission shafts 22 and 22ª extending from opposite sides of the case 3—see Fig. 5. Driving sprocket chains 23 embrace and coöperate with the sprockets 20 and 21. The shafts 22 and 22ª are the driving shafts; and these two shafts are rotated by power transmitted from the motor through differential gearing, said gearing being inclosed within and mounted on the transmission casing 3.

The differential gear mechanism includes a bevel gear 26 keyed to the motor shaft 27, said gear 26 being in mesh with a companion bevel gear 28 which is fixed on a rotatable shaft 29. The shaft 29 carries a spur gear 30 in mesh with a gear 31 on the shaft 32. The gear 31 is in mesh with a gear 33. Integral with, or rigidly attached to the gear 33 on each side thereof are pinions 33$^a$ and stub shafts or trunnions 33$^b$, said trunnions 33$^b$ being rotatably mounted in the bore of the driving shafts 22 and 22$^a$. Rigidly attached to the inner terminals of the driving shafts 22 and 22$^a$ are plates 22$^b$ and 22$^c$. Twin pinions 34 are rotatably mounted, diametrically opposite on the plates 22$^b$; and these pinions are in mesh with one of the pinions 33$^a$. Likewise twin pinions 34$^a$ are rotatably mounted on the plate 22$^c$; and these pinions are in mesh with the opposite pinion 33$^a$. The twin pinions 34 are in mesh with an internal gear 35, which is provided with a drum 35$^b$ rotatably mounted on the shaft 22, and the twin pinions 34$^a$ are in mesh with a like internal gear 35$^a$ having a drum 35$^c$ rotatably mounted on the shaft 22$^a$. A brake band 37 provided with take-up members 37$^a$ and 37$^b$, embraces the drum 35$^c$, and a like brake band 36 having take-up members corresponding to those on band 37 embraces the drum 35$^b$. The brakes 36 and 37 are controlled by screw members 38 and 39, the heads 38$^a$ and 39$^a$ bearing on the undersides of the members 36$^b$ and 37$^b$, respectively, and the shanks of the screws being threaded in the take-up members. The screw member 38 is provided with a pinion 40, and the screw 39 carries a like pinion 41. The pinions 40 and 41 are in mesh with a gear 42, said gear being keyed, or otherwise fixed on the steering shaft 43 which is operated by the hand-wheel 44.

When the gear 42 is in its normal position the brake pressure on the two drums 35$^b$ and 35$^c$ is equal and sufficiently severe to retain said drums, and the shafts 22 and 22$^a$ are driven in the same direction and in unison, by the motor, through the train of gears 26, 28, 30, 31 and 33. The gears 33$^a$ being attached to the gear 33, drive the twin pinions 34 and 34$^a$ which being in mesh with the internal gears 35 and 35$^a$ and mounted on the plates 22$^b$ and 22$^c$, rotate said plates which in turn drive the shafts 22 and 22$^a$, the gears 35 and 35$^a$ rotating with said shafts. The sprockets 21 being rigid with the shafts 22 and 22$^a$ and connected with the sprockets 20 by the chains 23, transmit power from the driven shafts 22 and 22$^a$ to the traction wheels 13 and thereby cause the traction belts to travel in the usual manner and therefore cause the machine to move forward or backward according to their direction of travel.

The tractor is steered, or turned to the right or left by the application of braking pressure to one or the other of the two drums 35$^b$, 35$^c$. When the brake pressure is released alternately, the drums 35$^b$ and 35$^c$ rotate and the respective shafts 22 and 22$^a$ do not rotate, and consequently when the brake-bands are alternately tightened the drums are held fast and the respective shafts 22 and 22$^a$ rotate. The gears 40 and 41 which control the brake pressure through the medium of the screw members 38 and 39, being in mesh with the gear 42, are operated by said gear 42 in unison but in opposite directions. Therefore when increased brake pressure is applied to the member 35$^b$, the brake pressure on member 35$^c$ is relieved. The result will be that the shaft 22 is rotated, and the driving traction wheel located on the same, or left hand side, will be driven through the medium of the sprocket mechanism connecting said wheel and the shaft 22, while the traction wheel on the opposite, or right hand side, will idle, with the result that the tractor will turn to the right. By applying the braking pressure on the member 35$^c$, and relieving it on the member 35$^b$ the coöperating action of the corresponding parts will cause the tractor to turn to the left.

Provision is made for utilizing the tractor as a motive means for driving stationary machines such as, for example, churns, fodder cutters, or filling silos. To this end a shaft 50 is mounted in suitable bearings on the transmission case 3. The shaft 50 carries one or more out-board pulleys 51 and a spur pinion 52, the said pinion 52 being operated from the gear 31 through an intermediate gear 53. In the present embodiment, when it is desired to employ the tractor as a stationary motive power means, the driving chains 23 are disconnected, thereby cutting out the traction mechanism, but it will readily be seen that suitable clutch mechanism could be embodied in the construction, for shifting the power.

Adjustable ballast means are provided in the construction of the present tractor, by making the traction wheels 13 and 14 serve as reservoirs for liquid ballast which may be increased or diminished as desired. This feature is embodied in one wheel of a tandem tractor for which I have made application for Letters Patent, said application being Serial No. 210,116, filed January 3rd, 1918, and while the function of this specific element is the same in the present invention as in the former, it is applied to four of the wheels and the general construction and arrangement of parts is different, therefore the ballast means is embodied as a part of this invention.

The construction and arrangement of parts substantially as shown and described, provides a durable and efficient tractor that is comparatively light, and economical to manufacture, and one that can be increased in weight as circumstances require. The relative proportions of the traction wheels, whereby the forward part of the machine is elevated, adds greatly to the efficiency of the tractor in surmounting obstacles.

Having described my invention, what I claim and desire to secure by Letters Patent is:—

1. In a tractor, the combination of a gear casing, two alined tubular drive shafts mounted in said casing, sprockets carried by said shafts, driving traction wheels provided with sprockets, sprocket chains connecting the drive shafts and traction wheel sprockets, differential mechanism between the alined drive shafts, which mechanism includes a trio of spur gears operative in unison and provided with trunnions mounted in the drive shafts, two pairs of twin gears rotatably mounted in fixed relation to said drive shafts, each of the outer members of the trio of gears in mesh with one pair of the twin gears, means coacting with the intermediate member of said trio for driving same, two internal gears rotatably mounted relatively to the drive shafts, one of said internal gears being in mesh with both members of one pair of the twin gears, and the other internal gear in like mesh with the opposite pair, and brake means for checking the rotation of said internal gears.

2. In a tractor, the combination of a gear casing, two alined tubular drive shafts mounted on said casing and extending on opposite sides therefrom, sprockets carried on the outer ends of said drive shafts, driving traction wheels provided with sprockets, sprocket chains connecting the drive shaft sprockets and the traction wheel sprockets, differential mechanism between the alined drive shafts, said mechanism comprising two internal gears provided with brake drums and adapted to rotate on said drive shafts, a trio of spur gears operative in unison and provided with trunnions mounted in the bores of the drive shafts, two pairs of twin gears rotatably mounted in fixed relation to said drive shafts and in mesh with the internal gears respectively, the two outer members of the trio of gears in mesh respectively with the twin gears on the drive shafts, means coacting with the intermediate member of said trio of gears for driving same, and means for applying brake pressure to one brake drum and releasing the pressure from the other drum at the same time.

3. In a tractor, the combination of a gear casing, two oppositely extended alined tubular drive shafts rotatably mounted in said gear casing, two brake drums which are respectively mounted to rotate on the drive shafts, internal gears provided in said brake drums, means for applying brake pressure to said drums, a trio of spur gears operative in unison arranged between the two alined shafts and provided with trunnions adapted to rotate respectively in the bores of said shafts, the intermediate gear of said trio being driven by a train of gears from a motor provided therefor, the other two gears of the trio being in mesh with two pairs of twin gears mounted respectively on the alined shafts in fixed relation to said shafts and in mesh with the internal gears of the brake drums.

4. In a chain belt tractor, the combination of a main frame, a gear case fixed thereto, a traction frame located outside the main frame, said traction frame being connected with the rear of the main frame by depending brackets, and having a spring suspension connection with the forward end of said main frame, driving traction wheels rotatably mounted on a fixed axle on each side of the main frame inside the traction frame, flanged traction wheels rotatably mounted on fixed axles on each side of the main frame in alinement with and in forward and after relation to said driving traction wheels, the after pair of said flanged wheels being of greater diameter than the forward pair, a chain link belt track embracing each set of associated traction wheels, sprockets on the hubs of the driving traction wheels, two oppositely extended alined tubular drive shafts mounted in the gear casing, sprockets carried by said drive shafts, sprocket chains embracing the drive shaft sprockets and the traction wheel sprockets, differential mechanism mounted in the gear casing between the alined drive shafts, said differential mechanism comprising a trio of spur gears operative in unison and provided with trunnions mounted in the drive shafts, two pairs of twin gears rotatably mounted in fixed relation to said drive shafts, each of the outer members of the trio of gears in mesh with one pair of the twin gears, means coacting with the intermediate member of said trio for driving same, two internal gears rotatably mounted relatively to the drive shafts, one of said internal gears being in mesh with both members of one pair of the twin gears and the other internal gear in like mesh with the opposite pair, and brake means for checking the rotation of said internal gears.

5. In a chain belt tractor, the combination of a main frame, a gear case fixed thereto, a traction frame located outside the main frame, said traction frame being connected with the main frame, driving traction wheels rotatably mounted on a fixed axle on each side of the main frame inside of the traction frame, flanged traction wheels rotatably mounted on fixed axles on each side of the main frame in alinement with and in forward and after relation to said driving traction wheels, the after pair of said flanged wheels being of greater diameter than the forward pair, reservoirs provided in the after and driving traction wheels, a chain link belt track embracing each set of associated traction wheels, sprockets on the hubs of the driving traction wheels, two oppositely extended alined tubular drive shafts mounted in the gear casing, sprockets carried by said drive shafts, sprocket chains embracing the drive shaft sprockets and the traction wheel sprockets, differential mechanism mounted in the gear casing, said differential mechanism comprising a trio of spur gears operative in unison and provided with trunnions mounted in the bores of the drive shafts, two pairs of twin gears rotatably mounted in fixed relation to said drive shafts, each of the outer members of the trio of gears in mesh with one pair of the twin gears, means coacting with the intermediate member of said trio for driving same, two internal gears rotatably mounted relatively to the drive shafts, one of said internal gears being in mesh with both members of one pair of the twin gears, and the other internal gear in like mesh with the opposite pair, and brake means for checking the rotation of said internal gears.

6. In a tractor, the combination of a gear casing, two oppositely extended alined tubular drive shafts rotatably mounted in said gear casing, two brake drums which are respectively mounted to rotate on the drive shafts, internal gears provided in said drums, means for applying brake pressure to said drums, a trio of spur gears operative in unison arranged between the alined shafts and provided with trunnions adapted to rotate respectively in the bores of said shafts, the intermediate gear of said trio being driven by a train of gears from a motor provided therefor, the outer two gears of the trio being in mesh with two pairs of twin gears mounted respectively on the alined shafts in fixed relation to said shafts and in mesh respectively with the internal gears of the brake drums, and a transverse pulley shaft mounted in the gear casing, one or more pulleys carried by said shaft, and a gear on said shaft in operative connection with the train of gears driven by the motor.

7. In a tractor, the combination of a gear casing, two oppositely extended alined tubular drive shafts rotatably mounted in said gear casing, two brake drums which are respectively mounted to rotate on the drive shafts, internal gears provided in said brake drums, split brake bands provided with blocks at their adjacent ends, embracing the drums, screws operating in said blocks, pinions carried by said screws, a steering shaft having a gear fixed thereon, said gear being in mesh with the pinions on said screw members whereby the rotation of the steering shaft will apply brake pressure to one drum and relieve the pressure on the opposite drum, a trio of spur gears operative in unison arranged between the two alined shafts and provided with trunnions adapted to rotate respectively in the bores of said shafts, the intermediate gear of said trio being driven by a train of gears from a motor provided therefor, the other two gears of the trio being in mesh with two pairs of twin gears mounted respectively on the alined shafts in fixed relation to said shafts and in mesh respectively with the internal gears of the brake drums.

In testimony whereof I affix my signature.

ALBERT V. RACKSTRAW.